(12) United States Patent
Blaser et al.

(10) Patent No.: US 8,777,233 B2
(45) Date of Patent: Jul. 15, 2014

(54) DIAPHRAGM CHUCK

(76) Inventors: Ralf Blaser, Baienfurt (DE); Eckhard Maurer, Oberteuringen (DE)

( * ) Notice: Subject to any disclaimer, the term of this patent is extended or adjusted under 35 U.S.C. 154(b) by 261 days.

(21) Appl. No.: 13/199,659

(22) Filed: Sep. 6, 2011

(65) Prior Publication Data

US 2012/0119452 A1 May 17, 2012

(30) Foreign Application Priority Data

Sep. 7, 2010 (EP) ..................................... 10175564

(51) Int. Cl.
*B23B 31/32* (2006.01)

(52) U.S. Cl.
USPC ............ 279/136; 279/124; 279/139; 279/152

(58) Field of Classification Search
USPC .................. 279/136, 124, 139, 152, 4.05, 123
See application file for complete search history.

(56) References Cited

U.S. PATENT DOCUMENTS

| | | | |
|---|---|---|---|
| 2,543,117 A | | 2/1951 | Mackmann |
| 2,568,585 A | | 9/1951 | Hohwart et al. |
| 2,933,320 A | | 4/1960 | Lyons |
| 3,190,664 A | * | 6/1965 | Hohwart ...................... 279/4.05 |
| 3,583,717 A | * | 6/1971 | Hall et al. ...................... 279/123 |
| 4,067,586 A | | 1/1978 | Morawski |
| 4,431,202 A | * | 2/1984 | Swenson ........................ 279/106 |
| 4,556,228 A | * | 12/1985 | Ferraro .......................... 279/154 |
| 4,561,663 A | * | 12/1985 | Ferraro .......................... 279/123 |
| 4,671,520 A | | 6/1987 | Schreiber et al. |
| 6,283,686 B1 | * | 9/2001 | Gill ................................. 409/26 |
| 2007/0235954 A1 | * | 10/2007 | Rehm ........................... 279/139 |

FOREIGN PATENT DOCUMENTS

| | | |
|---|---|---|
| CH | 339081 | 2/1955 |
| DE | 10207144 | 8/2003 |
| FR | 2861000 | 4/2005 |
| GB | 465855 | 5/1937 |

* cited by examiner

*Primary Examiner* — Andrea Wellington
*Assistant Examiner* — Chwen-Wei Su
(74) *Attorney, Agent, or Firm* — Pandiscio & Pandiscio

(57) ABSTRACT

A diaphragm chuck with an operating element inserted in a chuck body and axially movable in relation to the chuck body, a diaphragm attached to a free end of the operating element with the diaphragm secured to the chuck body by its outer circumference, three base jaws in driving connection with the diaphragm, on each of which a centering surface is disposed in a concentric alignment with the axis of the operating element, three clamping jaws attached to the corresponding base jaws, by which a gear to be machined can be clamped and which make contact with the centering surface, and clamping pins, each allocated to one of the clamping jaws, radially aligned and arranged between two teeth of the gear in the clamped condition, such that the diaphragm chucks reliably clamps differently sized gears and gears with different numbers of teeth between the three clamping jaws.

7 Claims, 9 Drawing Sheets

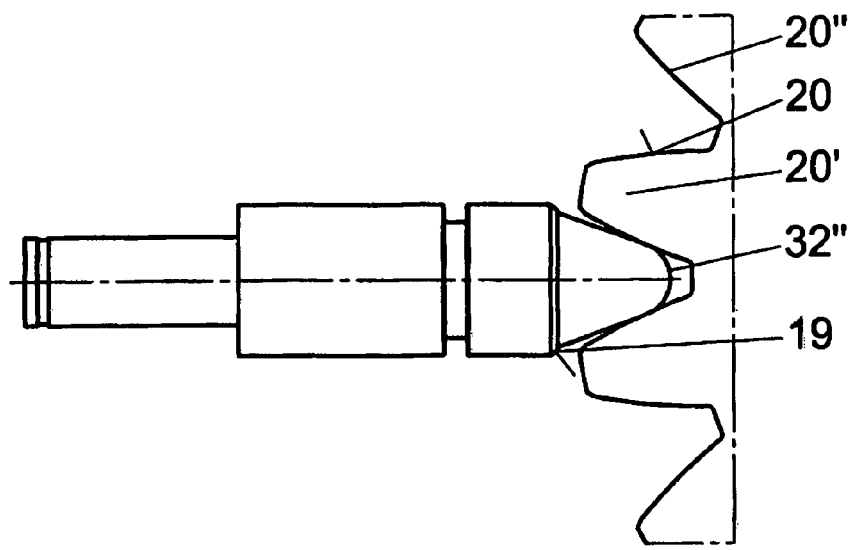
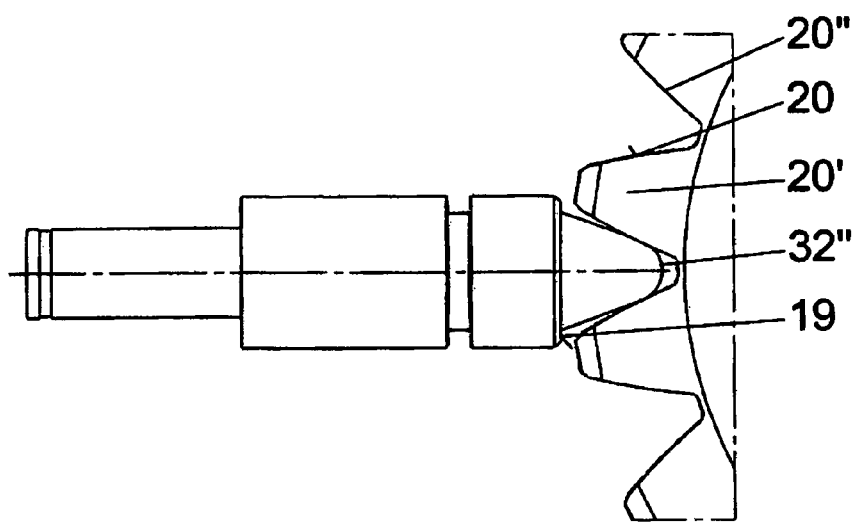
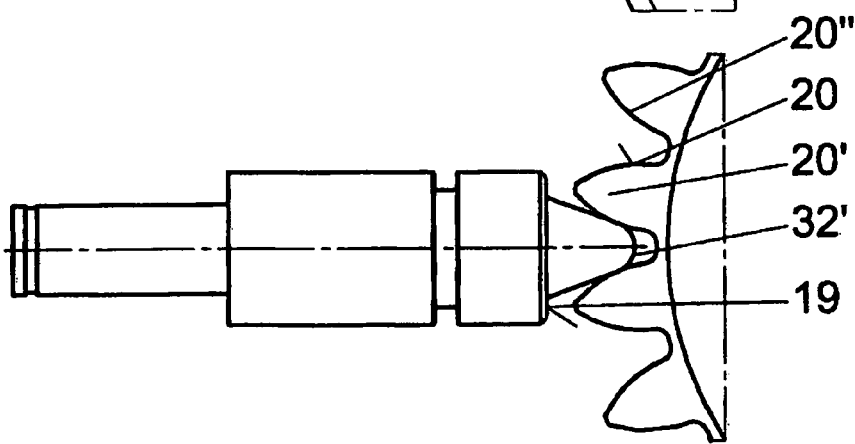

DIAPHRAGM CHUCK

BACKGROUND OF THE INVENTION

1. Field of the Invention

The present invention relates to a diaphragm chuck.

2. Description of the Prior Art

Diaphragm chucks of this type are described in EP 1 837 108 B1 and EP 1 757 392 B1. A diaphragm attached to an operating element is tilted outwards in an area where it is attached to the chuck body, as a result of which a swivelling movement of a base jaw attached to a machine occurs in a radially outward direction. The operating element is configured, for example, as a pneumatically or hydraulically operated piston with a piston rod attached thereto, which is moved in the direction of a workpiece to be clamped, in order to open base jaws and clamping jaws attached thereto, with the effect that a workpiece can be removed from the clamping jaws, or a new workpiece to be machined can be inserted between the clamping jaws.

Although diaphragm chucks of this kind have proven themselves in practice, they do suffer from the disadvantage that the clamping jaws and the base jaws on the chuck body must be reconfigured for each workpiece that is to be machined, because the radial stroke of the clamping and base jaws is only a few millimeters as the diaphragms only move through an extremely small advance and opening stroke. In particular, if gears are to be clamping in the diaphragm chuck for machining, then different base and clamping jaw arrangements have to be mounted on the chuck body for each geometrical dimension of the particular gear. If, for example, the base circle of the gear is reduced or increased in size whilst maintaining a constant pitch, then the clamping jaw/base jaw arrangement system intended for a particular base circle cannot be used, because the distance between the clamping pins and the gear to be clamped ends up too large or too small with the effect that no clamping force can be generated, or the clamping pins make contact with the gear before the diaphragm has been moved back to its initial position in order to generate the clamping force.

As a result, companies which wish to use such diaphragm chucks need to have a corresponding clamping jaw/base jaw unit for almost every geometry of gears to be machined, so that there will be a unit adapted geometrically accurately to the particular gear to be machined.

SUMMARY OF THE INVENTION

An object of the present invention is, therefore, to improve a diaphragm chuck of the aforementioned type by enabling it reliably to clamp differently sized gears and gears with different numbers of teeth (i.e. different tooth pitches) between the three clamping jaws.

Centering grooves worked into a base element and corresponding clamping jaws can be aligned by means of keys that are inserted in the grooves, with the effect that distances can be adjusted in the circumferential direction between the three clamping jaws and the geometrical outer contour of the gear to be clamped, and in relation to the pitch (i.e. the number of teeth on the gear wheel), without the need for exchanging the clamping jaws or the base jaws. The assembly of the clamping jaw and base jaw can therefore be used for gears with different pitch values and differently sized base circles, because not only can the clamping jaws be aligned concentrically about the middle point of the chuck but also the radial distance between the heads of clamping pins can be adjusted variably within a certain range of dimensions.

Furthermore, it is advantageous for the heads of the clamping pins to be able to be adjusted to the geometry of the teeth, in particular to the geometry of two adjacent flanks of teeth, in such a way that the heads end up in contact between the two adjacent tooth flanks and therefore clamp the gear reliably.

BRIEF DESCRIPTION OF THE DRAWINGS

The drawings show a sample embodiment of a diaphragm chuck configured in accordance with the present invention, the details of which are explained below. In the drawings.

FIGS. 6A, 6B and 6C are elevational views showing clamping pins projecting radially from the clamping jaws and inserted between two adjacent teeth of a clamped gear.

DESCRIPTION OF THE PREFERRED EMBODIMENTS

Figure 1A:
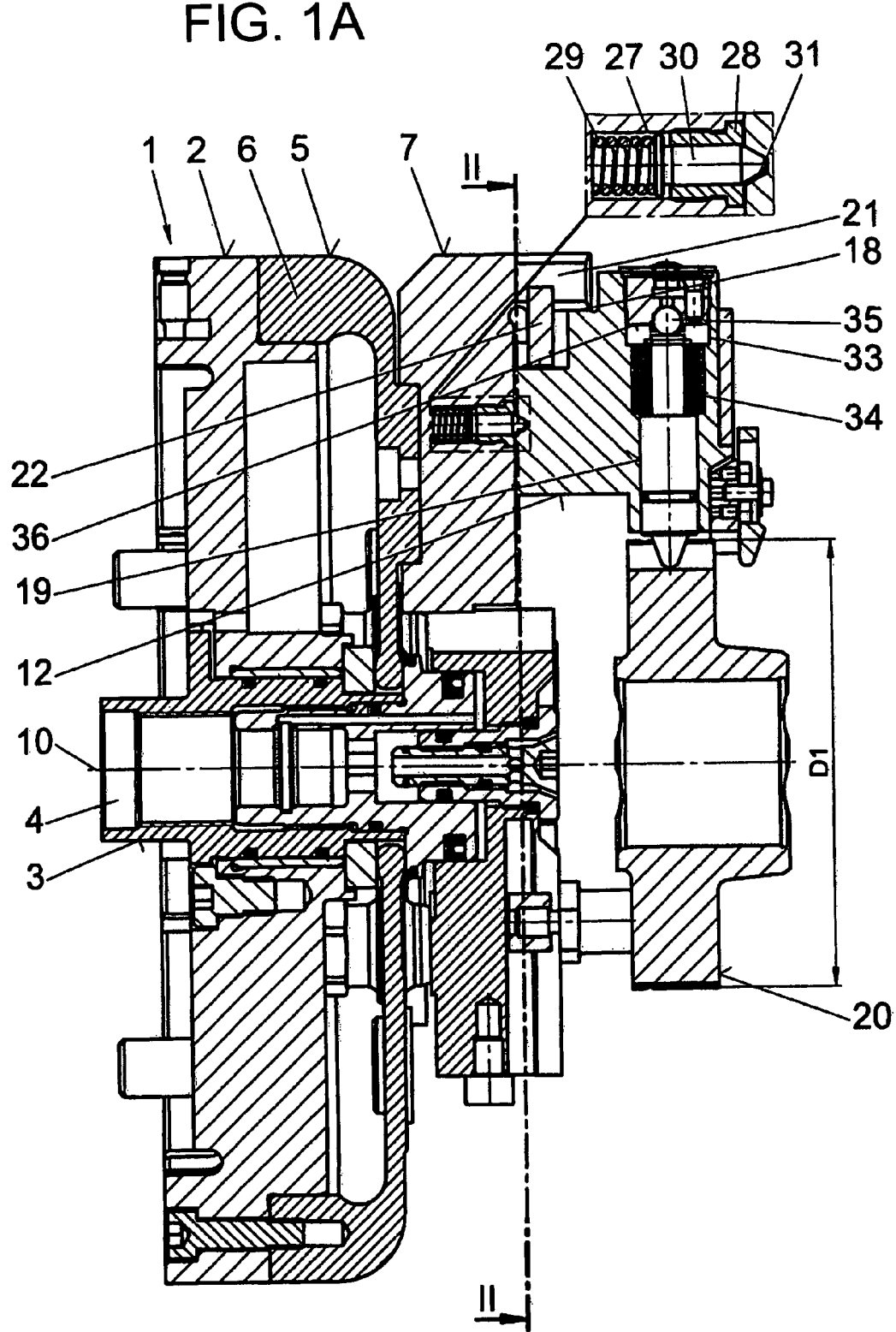
FIG. 1A is a sectional view of a diaphragm chuck with a chuck body, an operating element with a diaphragm attached to a free end thereof, as well as a base jaw is attached to the diaphragm, and a clamping jaw attached to the base jaw for clamping a gear.
Figure 1B:
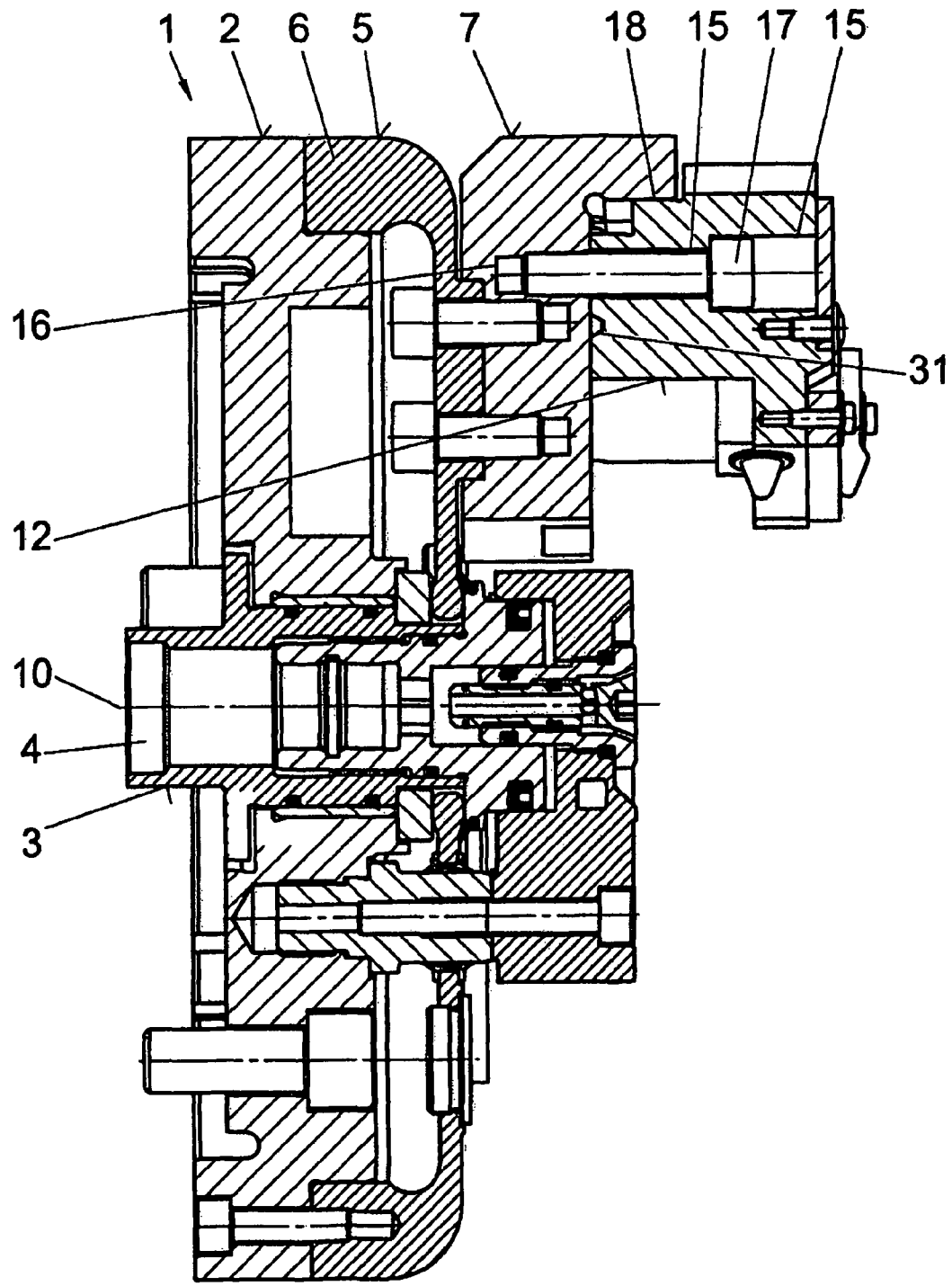
FIG. 1B is a sectional view of the diaphragm chuck in accordance with FIG. 1A, along a sectional plane running parallel to a line II-II in FIG. 1A.
Figure 1C:
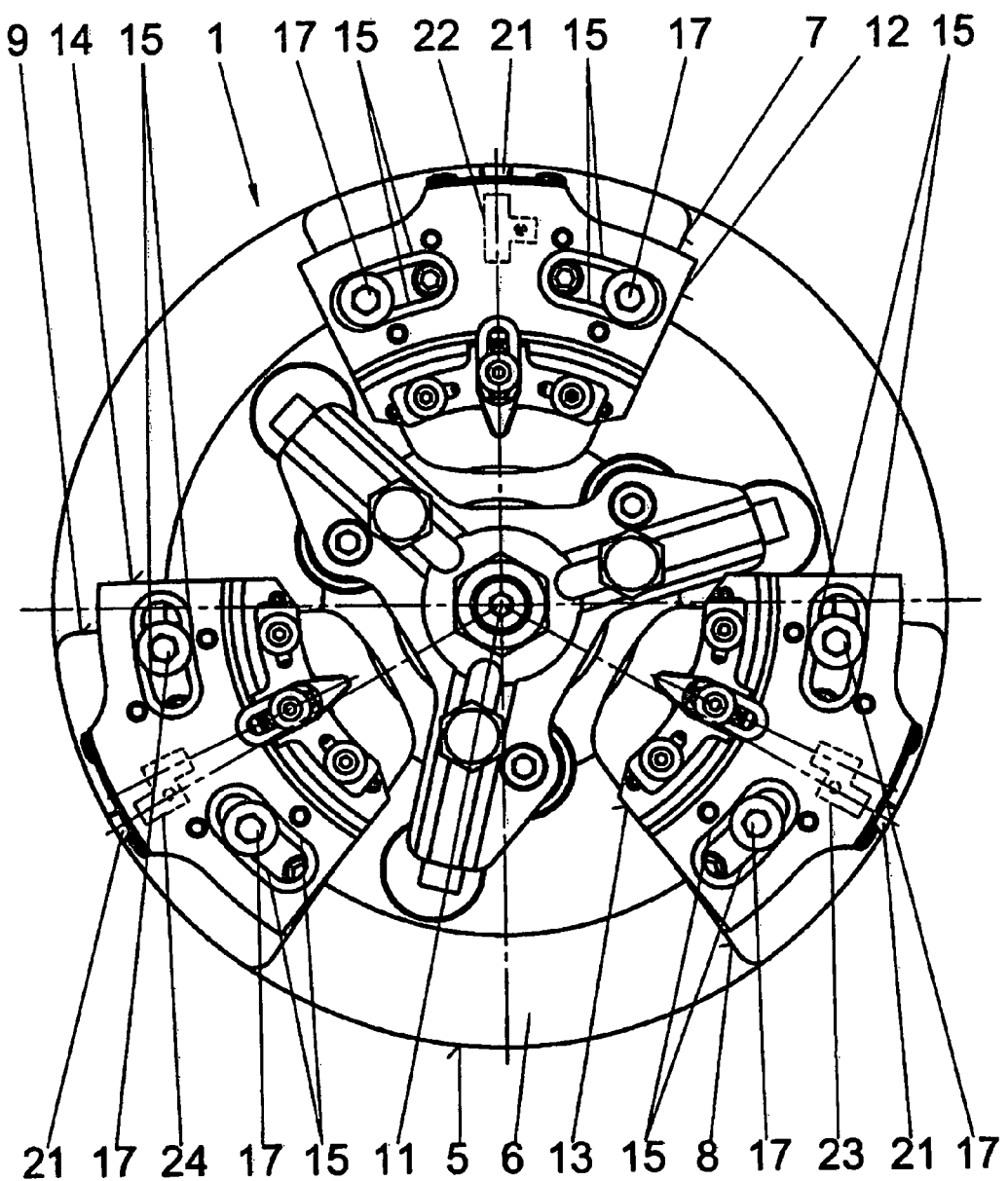
FIG. 1C is a plan view of the diaphragm chuck in accordance with FIGS. 1A and 1B.
Figure 2:
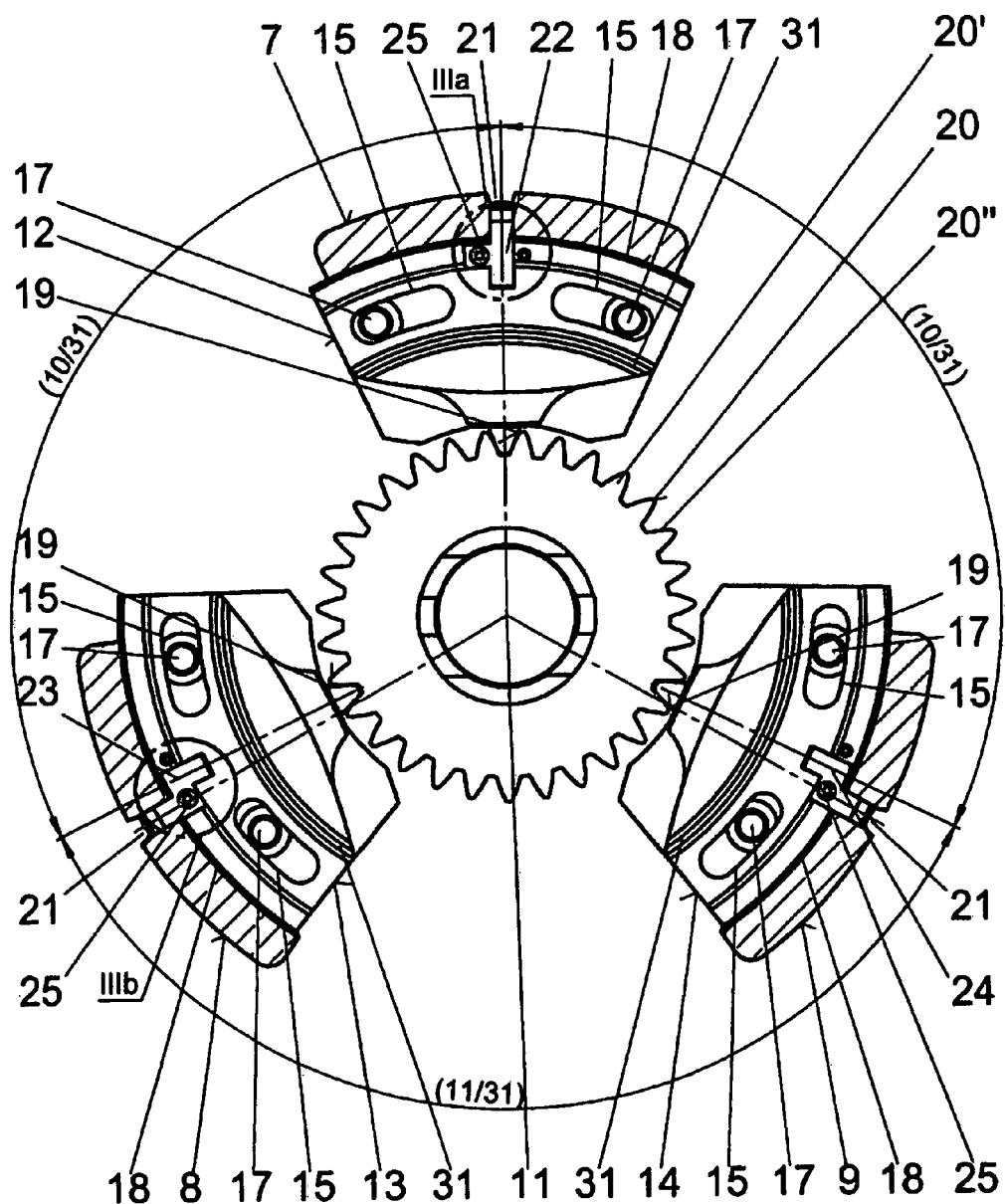
FIG. 2 is a plan view of the diaphragm chuck in accordance with FIG. 1A along line II-II, with a gear to be clamped comprising 31 teeth, FIGS. 3A and 3B each show perspective views of the base jaws and the clamping jaws in accordance with FIG. 1A, with a centering groove worked into each, and into which a key with different cross-sectional shapes is insertable for aligning the clamping jaw with the base jaw.

FIGS. 1A, 1B and 1C show a diaphragm chuck 1 with a chuck body 2 in which an operating element 3 is mounted in a central and axially movable arrangement. The operating element 3 can be configured, for example, as a hydraulically or pneumatically operated piston with a piston rod attached to it. The operating element 3 runs in alignment with an axis 10 of the chuck body 2. A free end 4 of the operating element 3 is provided a diaphragm 5 connected to it in a drivable arrangement. An outer circumference 6 of the diaphragm 5 is attached to the chuck body 2, with the effect that the stroke movements, i.e. the axial movements of the operating element 3, are parallel to the axis 10 of the chuck body 2 and result in a deflection of the diaphragm 5.

Three base jaws 7, 8 and 9 are attached to the diaphragm 5 at an angle of 120° in relation to one another, with the effect that deflections of the diaphragm 5 lead to the base jaws 7, 8 and 9 being swivelled radially outwards or inwards. A clamping jaw 12, 13 and 14 is attached to each of the base jaws 7, 8 and 9, which guarantees that the three clamping jaws 12, 13 and 14 carry out the radial tilting movements of the base jaws 7, 8 and 9. The position of the clamping jaws 12, 13 and 14 can be variably adjusted—as explained below—in relation to the corresponding base jaws 7, 8, 9.

A gear 20 should be able to be clamped by the clamping jaws 7, 8 and 9. The clamping jaws 12, 13 and 14 are aligned at an angle of about 120° in relation to one another. However, it is also feasible for more than three clamping jaws 12, 13 and 14, as well as more than three base jaws 7, 8 and 9, to be attached to the diaphragm 5.

It is necessary for the three clamping jaws 12, 13 and 14 to have an exactly equally sized distance in relation to the axis 10 of the chuck body 2 or the middle point 11 of chuck body 2, which should run in alignment with the middle point of the gear 20 to be clamped, in order to achieve machining and clamping of the gear 20 which is, if possible, free from tolerance. For this purpose, a centering surface 18 is worked on each of the base jaws 7, 8 and 9 concentrically about the middle point 11, with the radial distance of the centering surface 18 in relation to the axis 10 or the middle point 11 having the same size. The corresponding clamping jaw 12, 13 or 14 should be in contact with the centering surface 18 when installed, and be held by this centering surface 18 in a radial direction in the form of a stop, with the effect that the radial distance of the three clamping jaws 12, 13 and 14 in relation to the axis 10 or the middle point 11 is also of the same size.

To achieve this, each of the base jaws 7, 8 and 9 is provided with a hole 27, a detent guide 28, a compression spring 29, and a detent pin 30 inserted in it. The compression spring 29 presses the detent pin 30 out of the base jaw 7, 8 or 9 in such a way that the detent pin 30 projects from the plane formed by the corresponding base jaw 7, 8 or 9. A wedge-shaped or pyramid-shaped groove 31 is worked into the corresponding clamping jaws 12, 13 or 14, and this groove 31 must be aligned with the detent pin 30. The detent pin 30 projects into the corresponding groove 31. The inclined plane of the groove 31 gives rise to a force component running radially outwards and by means of which the corresponding clamping jaw 12, 13 or 14 is pressed in the direction of the centering surface 18 of the corresponding base jaw 7, 8 or 9, with the effect that the clamping jaws 12, 13 or 14 make contact with the centering surface 18.

A concentrically or arc-shaped slot 15 aligned about the middle point 11 is worked into each of the clamping jaws 12, 13 and 14, and a retaining screw 17 is inserted through the slot 15. One or more threaded holes 16 is/are provided in the corresponding base jaws 7, 8 or 9, with the effect that the clamping jaws 12, 13 or 14 are held in the threaded hole 16 of the base jaw 7, 8 or 9 by means of the retaining screw 17.

Each of the clamping jaws 12, 13 and 14 is provided with a through-hole 33 running radially, with a clamping pin 19 inserted in it. The head 32 of the clamping pin 19 is arranged between two teeth 20' of the gear 20. This can be seen in particular in FIGS. 1A, 1B and 1C. The external contour of the head 32 is adapted to the distances between the teeth 20', with the effect that the head 32 makes contact with the tooth flanks 20" of the gear 20 when clamped.

Furthermore, the radial distance of the head 32 of the corresponding clamping pin 19 can be changed by means of a setscrew 36 screwed into the through-hole 33 because the setscrew 36 pushes a ball 35 against the end of the clamping pin 19, with the effect that this can be moved against the force of a compression spring 34 inserted between the setscrew 36 and the clamping pin 19. The setscrew 36, the ball 35 and the clamping pin 19 form a common subassembly, with the effect that when the setscrew 36 is screwed in, the clamping pin 19 is pushed out of the clamping jaws 12, 13 or 14 and, when the setscrew 36 is screwed out, the clamping pin 19 is moved inwards in the direction of the clamping jaws 12, 13 or 14.

Due to the radial setting options of the clamping pins 19, it is possible to insert differently sized gears 20 between the three clamping pins 19.

Normally, the diaphragm 5 is deflected by the operating element 3; the operating element 3 is therefore moved in the direction of the gear 20 that is to be clamped. The stroke movement of the operating element 3 is about one mm, as a result of which the diaphragm 5 is deflected by about the same swivelling travel. The movement of the diaphragm 5 causes the clamping jaws 12, 13 and 14, as well as the base jaws 7, 8 and 9, to move in the radial direction, with the effect that the radial distance between the heads 32 of the clamping pins 19 is increased. The gear 20 to be machined can be inserted in the corresponding way. The operator must adjust the diaphragm chuck 1 in such a way that initially the operating element 3 is moved back towards its initial position. Following a stroke travel of about 0.8 mm, the heads 32 of the clamping pins 19 should secure the gear 20 to be clamped exactly centrally, with the effect that the middle point of the gear 20 and the axis 10 are in alignment with one another. The remaining stroke travel of 0.2 mm is required for the diaphragm 5 to establish a corresponding preload force by means of which the clamping force of the clamping pins 19 is generated. In addition, the operating element 3 can also be pushed or moved actively further back so that additionally a clamping force acts on the gear 20 by means of the clamping pins 19. The setscrew 36 of the clamping pins 19 must be changed in order for this setting position or clamping position to be found.

The gears 20 to be machined can have a different number of teeth (referred to as the pitch (T)) even if the base circle diameter is the same, therefore it is necessary for the concentric position of the clamping jaws 12, 13 and 14 to be able to be aligned in relation to the middle point 11 in order to enable the three clamping pins 19 to engage between two teeth 20'.

FIGS. 2, 3A, 3B, 3C, 4, 5A and 5B in particular show the positioning of the clamping jaws 12, 13 and 14 in relation to the different pitch (T) of the gears 20 to be machined. Each of the base jaws 7, 8 and 9 has a centering groove 21 worked into it; each of the clamping jaws 12, 13 and 14 also has a centering groove 21 provided in it. If, for example, the pitch (T) can be divided by the factor three, then the centering grooves 21 of the base jaws 7, 8 and 9 and the clamping jaws 12, 13 and 14 must be aligned with one another exactly. Flush alignment of the centering grooves 21 of the base jaws 7, 8 and 9 and of the clamping jaws 12, 13 and 14 can be achieved using three keys 22, 23 and 24, shown in FIG. 5B. The three keys 22, 23 and 24 have a T-shaped cross section. The keys 23 and 24 of the clamping jaws 13 and 14 are aligned offset from one another in a mirror-image arrangement.

Each of the keys 22, 23 and 24 is held in a threaded hole 26 worked into the corresponding base jaws 7, 8 or 9 by means of a screw 25.

If a gear 20 with, for example, thirty-one teeth must be clamped, then the clamping jaw 12 can be secured on the base jaw 7, as before, using a T-shaped key 22. The number of teeth between the clamping jaw 12 and the clamping jaw 13 should be ten, with the effect that the clamping jaw 13 must be moved out of the position shown in FIG. 5B in the direction of the clamping jaw 12. The key 23 is now configured with an S-shaped cross section, with the effect that the centering grooves 21 in the base jaw 8 are aligned so they are laterally offset in relation to the centering groove 21 of the clamping jaw 13.

The total of thirty-one teeth 20' of the gear 20 should be arranged between the clamping jaw 13 and the clamping jaw 14, with the effect that the clamping jaw 14 must be moved further away from the clamping jaw 13. This is achieved in that an S-shaped key 24 is inserted into the centering groove 21 of the base jaw 9 and of the clamping jaw 14, in which case the key 24 is arranged so it is offset in a mirror-image arrangement in relation to the key 23. This means there are ten of the total of thirty-one teeth 20' between the clamping jaw 12 and the clamping jaw 13/clamping jaw 14, and eleven of the total of thirty-one teeth 20' between the clamping jaws 13 and 14, shown in FIG. 2.

Figure 5A:
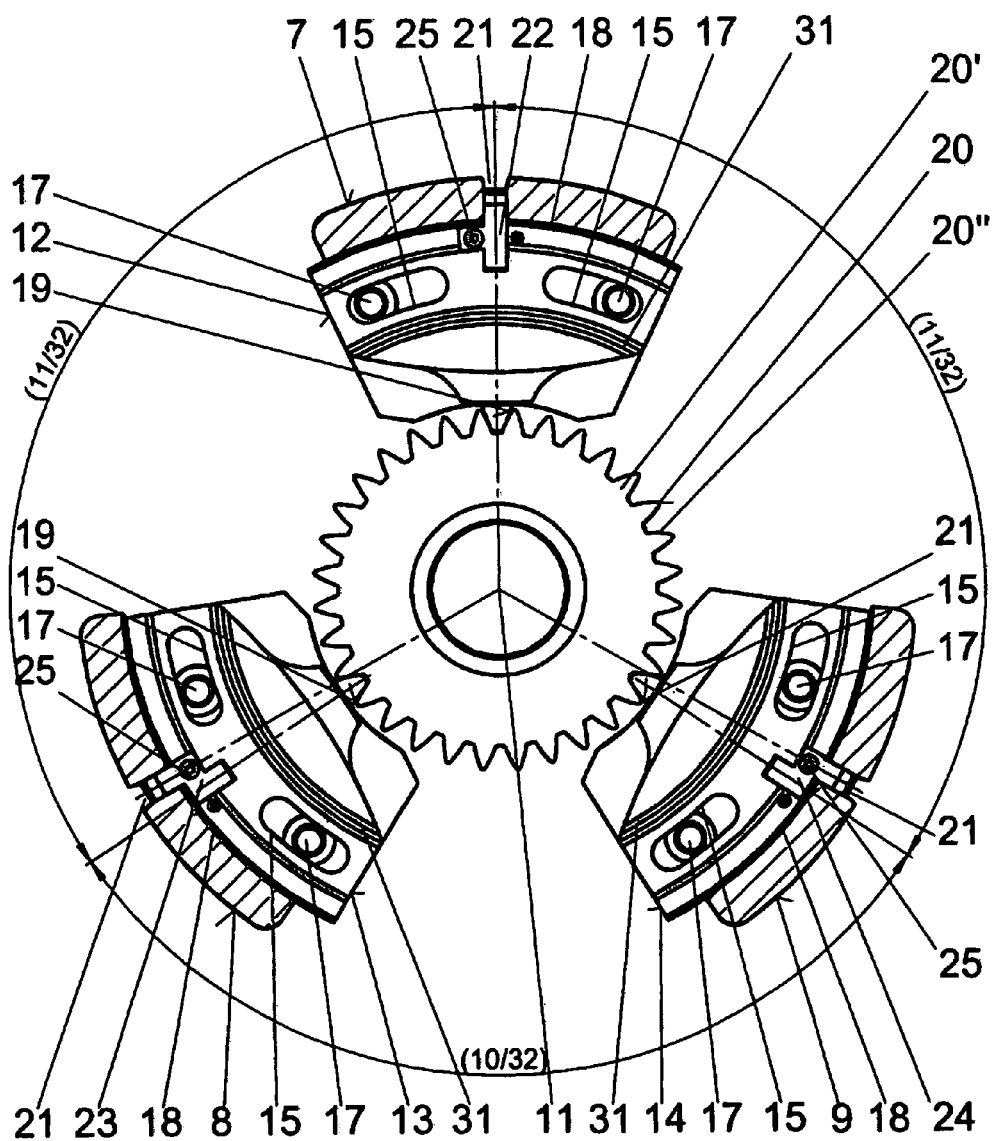
FIG. 5A is a plan view showing the diaphragm chuck in accordance with FIG. 1A, in which a gear with 32 teeth is clamped.
Figure 5B:
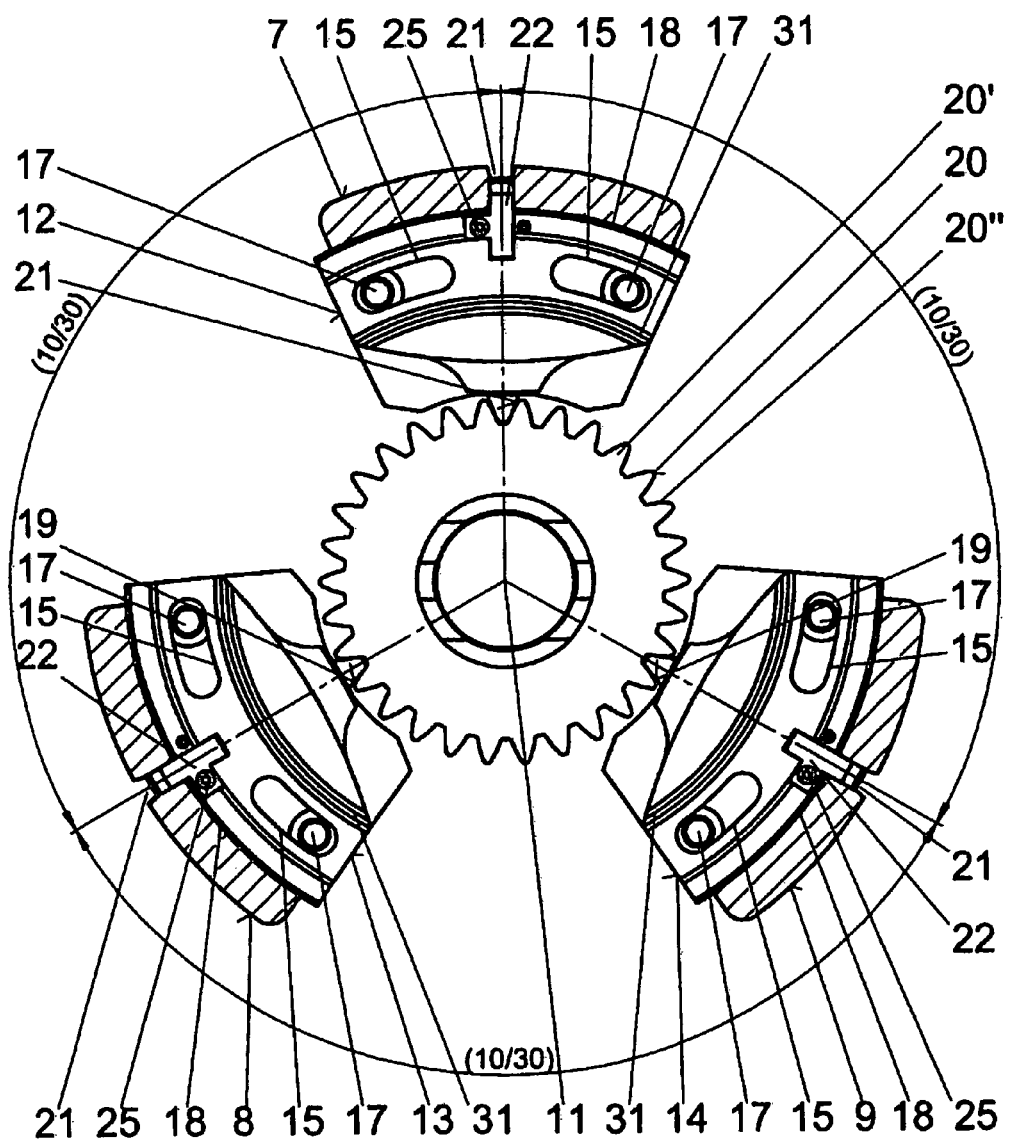
FIG. 5B is a plan view showing the diaphragm chuck in accordance with FIG. 1A, in which a gear with 30 teeth is clamped.

If a gear 20 with thirty-two teeth 20' should be clamped on the diaphragm chuck 1, then the positions of the clamping jaws 13 and 14 must be changed so that the distance between the clamping jaw 12 and the clamping jaw 13, or between the clamping jaw 12 and the clamping jaw 14, is increased to a total of eleven out of the thirty-two teeth 20', and therefore ten of the total of thirty-two teeth 20' are arranged between the two adjacent clamping jaws 13 and 14. FIG. 5A shows that the keys 23 and 24 have an S-shaped design and are offset from one another in a mirror-image arrangement. The leg of the key 23 projecting into the centering groove 21 of the base jaw 8 and the leg of the key 24 projecting into the centering groove 21 of the clamping jaw 14 face one another in this case.

The T-shaped or S-shaped cross-sectional shape of the keys 22, 23 and 24 therefore enables the concentric position of the clamping jaws 12, 13 and 14 to be adapted to the pitch (T) of the gear 20 that is to be clamped.

Figure 3A:
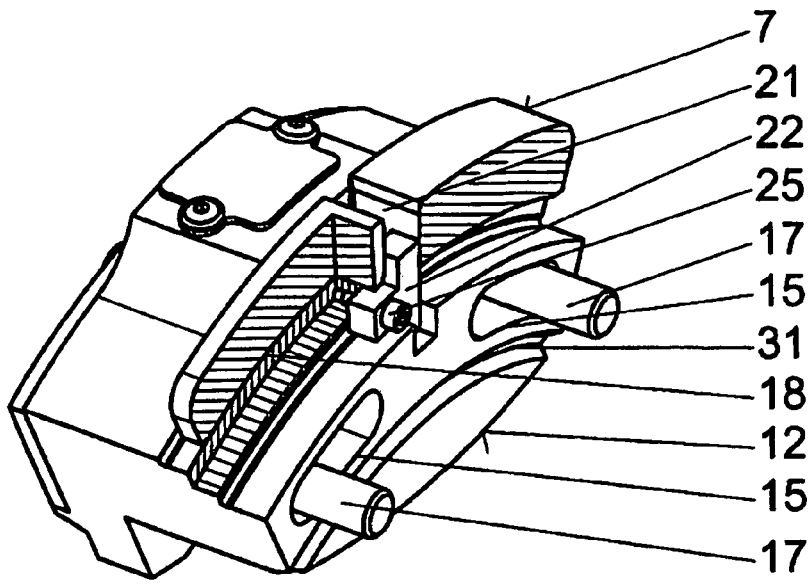
FIG. 3C is a sectional view further illustrating components shown in FIG. 3A.
Figure 3B:
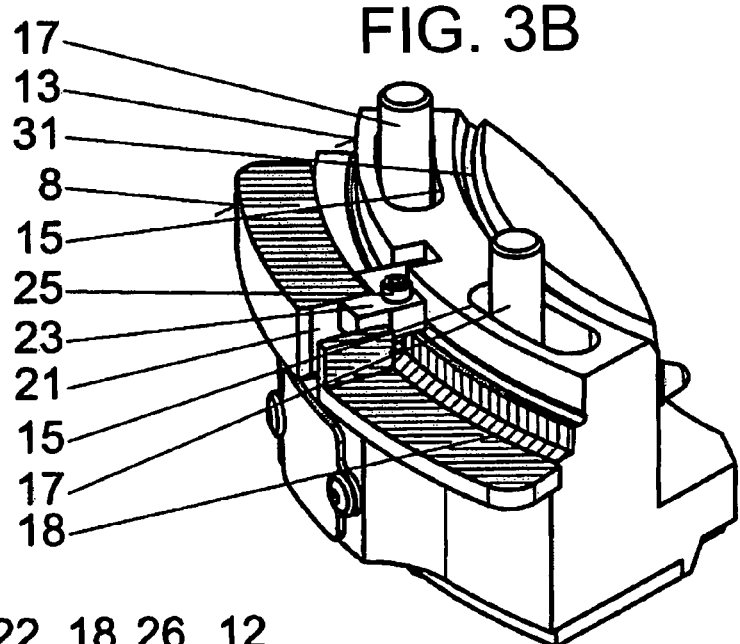
Figure 3C:
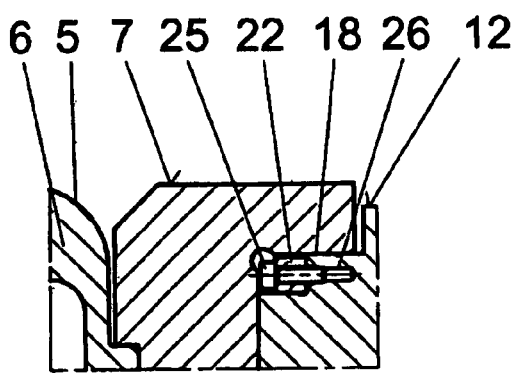
Figure 4:
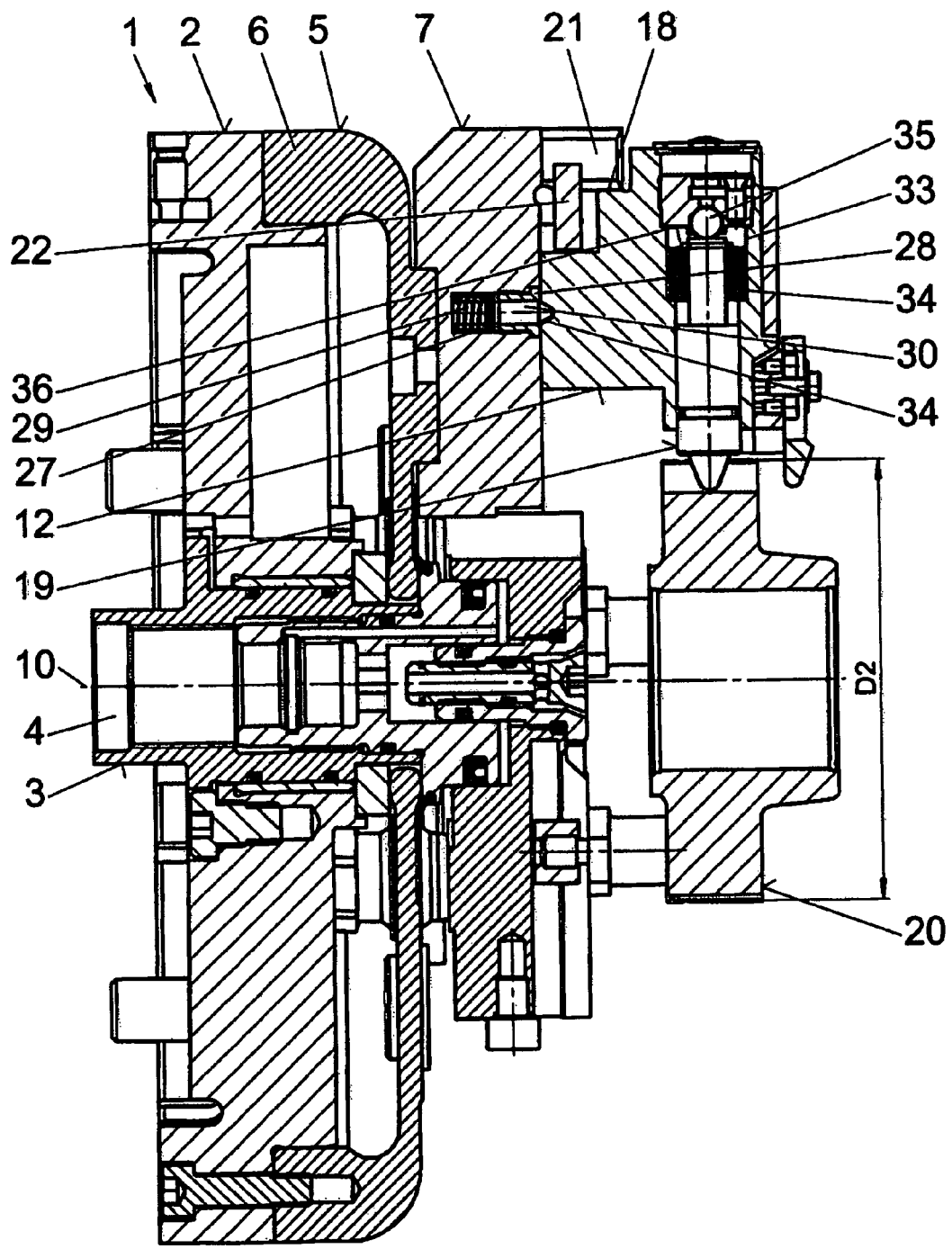
FIG. 4 is a sectional view showing the diaphragm chuck in accordance with FIG. 1A, by means of which a differently sized gear is clamped.

FIGS. 3A, 3B and 3C in particular, show the arrangement of the corresponding keys 22, 23 and 24 in the base jaw 7, 8 and 9 or the clamping jaw 12, 13 and 14.

The invention claimed is:

1. A diaphragm chuck comprising an operating element inserted in a chuck body and axially movable in relation to the chuck body, a diaphragm fixed to a free end of said operating element, said diaphragm being secured to the chuck body its outer circumference;
    three base jaws disposed in a driving connection with said diaphragm, on each of which a centering surface is disposed in a concentric alignment with an axis of said operating element;
    three clamping jaws attachable to corresponding ones of said base jaws, by means of which a gear to be machined can be clamped, and which make contact with the centering surface,
    and clamping pins, each allocated to one of said clamping jaws, and radially aligned and arranged between two teeth of a gear in the clamped condition,
    wherein a centering groove is disposed in said base jaws and said corresponding clamping jaws, a key is disposed in each of said centering grooves, and a cross-sectional shape and arrangement of said key is adapted to a pitch (T) of the gear to be clamped, such that the position of said corresponding clamping jaw is adapted to be changed by said corresponding key in relation to said centering groove in said base jaw concentrically to a middle point of the gear; and
    wherein one of said three keys is provided with a T-shaped cross section and said two other keys are provided with an S-shaped cross section, the two S-shaped keys being disposed in said centering grooves of said base jaw, and said clamping jaws are disposed in a mirror-image offset arrangement in relation to one another.

2. The diaphragm chuck in accordance with claim 1, wherein, each of said keys is attached by means of a screw in a threaded hole in said base jaw.

3. The diaphragm chuck in accordance with claim 1, wherein, at least one slot is disposed in said three clamping jaws, the slot extending concentrically, or in an arc shape, about the middle point of the chuck, and a retaining screw passes therethrough, the screw being held in a threaded hole disposed in said corresponding base jaws.

4. The diaphragm chuck in accordance with claim 3, wherein, said clamping jaws are each moveable independently of one another in their positions concentrically about the middle point of the chuck in a setting status, and said corresponding key allows centering of said corresponding clamping jaw in a circumferential direction.

5. The diaphragm chuck in accordance with claim 1, wherein, of said three clamping pins projecting towards the middle point of the chuck body are adapted to of the engage gear to be clamped such that movement of said diaphragm generates a pre-clamping force in a clamping status, by means of which the gear is disposed between said three clamping pins.

6. The diaphragm chuck in accordance with claim 1, wherein, a hole having a detent guide disposed therein is disposed in each of said base jaws and a detent pin is arranged in each of the detent guides, the detent pin being pressed in the direction of corresponding clamping jaws by means of a compression spring, and a groove extending in alignment with the corresponding detent pin is disposed in said clamping jaws, by means of which a force component acting radially outwards is generated to push said clamping jaws against the centering surface of said corresponding base jaw.

7. The diaphragm chuck in accordance with claim 1, wherein, a head of one of said clamping pins is adapted to fit within an inner contour of corresponding tooth flanks of the gear to be clamped, and said head of said clamping pin makes contact with the two adjacent tooth flanks in a clamped condition.

* * * * *